United States Patent Office 2,791,490
Patented May 7, 1957

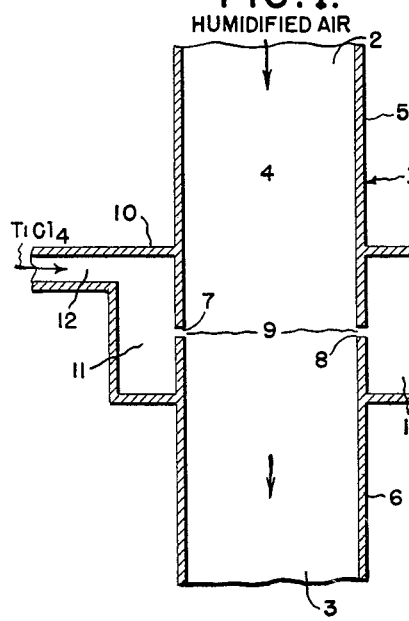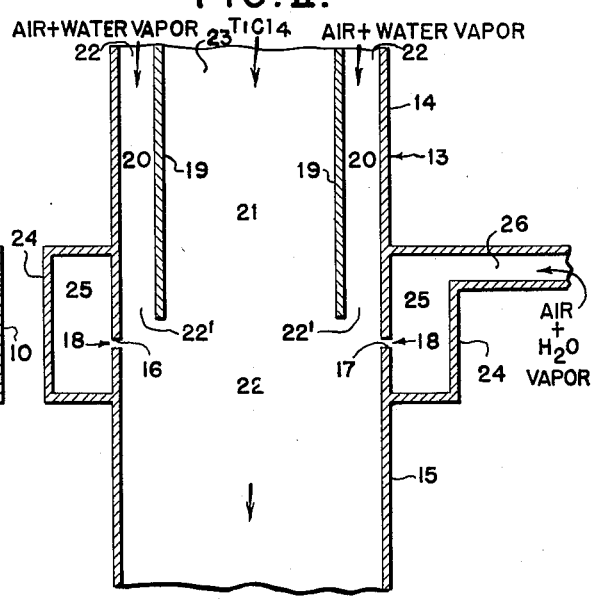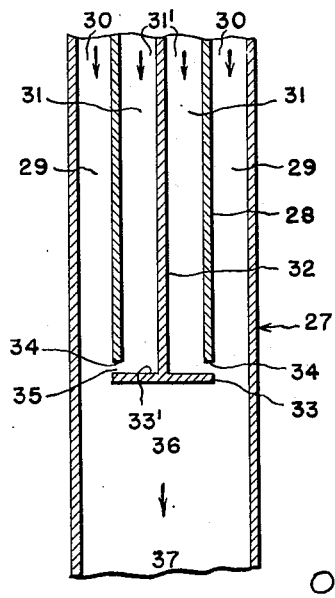

2,791,490

METHOD AND MEANS FOR COMMINGLING AND REACTING FLUID SUBSTANCES

Oswin B. Willcox, Wilmington, Del., assignor to E. I. du Pont de Nemours and Company, Wilmington, Del., a corporation of Delaware Application April 29, 1952, Serial No. 284,878

7 Claims. (Cl. 23—202)

This invention relates to novel methods and means for commingling and reacting fluid substances and more particularly to improved processes and apparatus for quickly and thoroughly mixing gaseous fluids, especially titanium tetrachloride and an oxidizing gas, to promote and expedite their interaction for the purpose of producing pigmentary titanium dioxide.

This application is a continuation-in-part of my copending (abondoned May 16, 1952) application Ser. No. 763,286, filed July 24, 1947.

In associating two or more fluids for reaction, the mixing operation in many instances must be effected under carefully controlled conditions and with great rapidity, so that complete reaction with high yields of reaction product will result. Various mixing devices, such as fuel and jet turbine types of burners in which rapid combination of oxygen with a combustible gas is required have been proposed. Jet mixers and injectors, wherein one reactant passes separately through a main conduit while the other or remaining reactants flow through auxiliary or separate tributary conduits with reactant mixing occurring at a point remote from the conduit discharge outlets, have also been proposed. A concentric jet type of mixer is an example of the latter type of device, the reactants flowing separately therein in the same direction and through a plurality of concentrically arranged tubular conduits to be ultimately mixed for reaction on discharge from such conduits. Such mixing, however, is not instantaneous and becomes complete at a point considerably removed from the points of such discharge. In addition, the reactants, as they proceed downstream into the reaction zone, impinge on one another to become gradually mixed in that zone and at an insufficiently rapid rate to effect maximum mixing efficiency or optimum conditions of reaction or yield. In the area surrounding the junction of the streams, the reactants tend to recirculate, are driven outwardly toward the walls of the reaction zone, thence backwardly toward the reactant inlets, and consequently impede or obstruct movement of the incoming streams of reactants. Countercurrents and eddies are set up along the internal walls of the reaction vessel which create objectionable "dead spots" wherein no perceptible reactant movement or mixing occurs. If a gaseous metal halide, such as titanium tetrachloride, is subjected to reaction with an oxygen-containing gas, such as air, in such device, objectionable TiO₂ crystal growth occurs at these "dead spots" which, because eventual apparatus plugging and stoppage will occur, necessitates frequent shut-downs for cleanout.

It is among the objects of this invention to overcome the disadvantages existing in prior devices for rapidly mixing or commingling fluid reactants and to provide novel methods and means for effectively attaining such objects. Particular objects include: the provision of a novel jet system type of mixing apparatus in which an efficient, thorough, and rapid blending or association of two or more fluid rectants is readily had, particularly with reactants which are in gaseous phase; the provision of a device in which the mixing operation is accomplished with the lowest possible energy input to the fluids being mixed and any tendency of the fluids after admixture to recirculate and impede the progress of any incoming streams of reactants being fed to the mixing or reaction zone is minimized or altogether prevented; the provision of a highly useful and efficient mixing apparatus for promoting the vapor phase reaction of gaseous fluids to produce finely divided metal oxides, especially pigmentary titanium dioxide, through the oxidation of a metal halide such as titanium tetrachloride. Other objects and advantages of the invention will be apparent from the ensuing description and accompanying illustrative drawings, wherein:

Fig. I comprises a diagrammatic, sectional view of one form of apparatus for carrying out the invention; while Figs. II and III comprise diagrammatic, sectional views of modified forms of apparatus also useful in practicing the invention.

In its broadest embodiment, the invention comprises novel methods and means for effecting the quick vapor phase mixing and reaction at temperatures ranging from about 800–1400° C. of gaseous fluids by conveying said fluids at independently controlled rates of flow through separate conduits therefor, and continuously commingling them in a closed mixing and reaction zone maintained in open communication with said conduits, by charging at least one reactant into said zone through a peripheral inlet for flow into said zone while in the form of a sheeted stream and directly into and in a direction angular to the axis of flow of at least one other reactant being separately and simultaneously charged into or through said zone.

In a more specific embodiment, the invention comprises rapidly mixing for vapor phase reaction a volatile metal halide, preferably titanium tetrachloride, with an oxidizing gas, preferably moisture-enriched air, by separately conveying said reactants at independently controlled velocities into an elongated, closed, restricted-in-cross-section mixing and reaction zone, and directly commingling the halide reactant continuously with the oxidizing reactant within said zone by flowing either reactant laterally into the other in the form of one or more thin, sheeted, encircling streams for flow across the axis of flow of the other reactant being separately introduced for passage through said zone.

Referring to the drawings, and particularly to Fig. I, a water or other circulating fluid-cooled type of slot jet mixing and reactor device is shown which is preferably constructed of a corrosion-resistant metal or alloy or lined in a suitable manner with a refractory material such as silica, magnesia, porcelain, etc. Said device comprises a tubular conduit or fluid conveying means 1 having an inlet 2, an outlet 3, and a fluid passage 4. The conduit 1 is composed preferably of the open-ended section members 5 and 6, the terminal or end portions 7 and 8 of which, respectively, are spacedly disposed in cooperative relationship from each other so as to form, as shown, a perimetric, transverse opening or elongated circumferential slot 9 which serves as a secondary or fluid mixing inlet for the conduit 1. Fixedly secured to or otherwise conveniently associated about conduit 1, particularly at the point where the peripheral slot 9 is formed therein and substantially surrounding or enclosing said slot, is a manifold element 10 having an internal passage 11 and inlet 12, through which a second fluid reactant can be separately passed, at controlled velocities, for continuous discharge into the passage 4 of conduit 1 through the slotted inlet 9, with which the passage 11 is in open communication.

In operating such Fig. I device to rapidly mix and react in the vapor phase, for instance, an oxidizable metal halide such as titanium tetrachloride with a moisture-enriched oxidizing gas, such as air, oxygen, or other oxygen-containing gas to obtain an improved rutile titanium dioxide pigment, in accordance with the methods disclosed in the co-pending application of Holger H. Schaumann, Ser. No. 653,428, filed March 9, 1946 (U. S. Pat. No. 2,488,439, dated November 15, 1949), the oxidizing gas at a temperature above 350° C. is separately and continuously fed from a source of supply (not shown) into the conduit 1 via its inlet 2 for passage therethrough at a controlled velocity. Simultaneously, the metal halide, also in the gaseous state, and at a temperature approximating that of the oxidizing gas, is separately conducted at a controled mass velocity (preferably ranging from about 15 to 40 times the mass velocity of the oxidizing medium) from a source of supply (not shown) through inlet 12 and passage 11 of manifold 10, from whence it continuously issues or charges from the slot inlet 9 in the form of a confined, relatively thin sheet or stream flowing laterally into the passage 4 of conduit 1 and radially from the outer periphery of said conduit towards the center of passage 4 and at right angles to and across the axis of flow of the oxidizing gas being separately passed therethrough. As a result, substantially instantaneous mixing and reaction of the two fluids occurs at substantially constant temperatures ranging from about 1000–1350° C., upon their coming together within the passage 4 and mixing and reaction is rendered substantially complete upon passage of the reactants but a short distance downstream from the slot inlet or their point of initial commingling. The reactor mixing and reaction zone is of such design, construction and dimension that a continuous flow of reactants and products of reaction within and through the oxidation chamber is always afforded, and such control over the velocities, mixing rates, temperatures and retention times will obtain that on the average the reactants and products of reaction remain within the oxidation zone for but a relatively short period of time, sufficient to provide a substantially complete reaction but insufficient to cause retention of the TiO$_2$ reaction product therein for a period of time in which undesired TiO$_2$ particle size growth will occur. Usually, retention times ranging from about .1 to 10 seconds, employing the indicated temperatures, afford substantially complete conversion of the titanium tetrachloride to titanium dixoide. When an oxidizing gas such as oxygen or oxygen-enriched air is used, resort can be had to retention times ranging from .01 to 10 seconds.

The gaseous reaction products, containing the TiO$_2$ in suspension, on discharge from the oxidation zone, are subjected to a quick cooling treatment to below 900° C., and preferably to below 600° C., to prevent any undesired TiO$_2$ particle size growth from taking place. This quenching of reaction products upon withdrawal from the mixing and reaction zone can be effected within from .01 to 10 seconds, and preferably within from .05 to 5 seconds, from the time of introduction into said zone of the metal halide and oxidizing gas reactants. Useful and effective methods for attaining this rapid cooling or quenching include the recirculation of cooled product gases from the system and their direct commingling with the gaseous TiO$_2$ suspension issuing from the oxidation zone, or by directly dispersing in the TiO$_2$-containing suspension cold, inert, finely divided refractory solids, such as finely divided silica, in accordance with the methods disclosed in the co-pending application of I. J. Krchma, Ser. No. 751,709, filed June 2, 1947, now abandoned. Separation and recovery of the final TiO$_2$ product can be then conventionally effected as by passing the cooled reaction products into suitable settling chambers, cyclone separators, or the like. The resulting pigment, being of uniformly small particle size, will inherently possess high tinting strength, color, opacity, and other essential pigment properties whereby it will be adaptable for use in all types of pigment applications, including paints, enamels, finishes, and other types of coating compositions, or as a delusterant for rayon or other artificial fibers and silks, as well as in printing inks, rubber, and the like.

To a clearer understanding of the invention, the following example is illustrative of one specific application of the invention in the mixing device just described:

*Example I*

Using a mixing device of the type shown in Fig. I, constructed of silica, and in which the tubular member 1 had an internal diameter of 1¾ inches and the slot inlet 9 was 1/32 of an inch in width and extended completely about the periphery of the conduit, preheated air, at a temperature of 800° C. and containing .95% H$_2$O by volume, was continuously charged at a rate equivalent to 19 parts by weight of O$_2$ per hour through the passage 4. Simultaneously, vaporized TiCl$_4$, at a temperature of 865° C., was continuously fed at a constant flow rate of 100 parts by weight per hour through passage 11 of the manifold 10 to charge through the slot inlet 9 in the form of a sheeted stream into the passage 4 and across the air stream being conveyed through the latter passage. Almost instantaneous mixing of the humidified air and TiCl$_4$ took place at the point of meeting of the reactants, with substantially complete mixing and reaction thereof (at a temperature of 1150° C.) being determined to have taken place at a point 2 inches downstream in the conduit 1 and below the mixing inlet 9. Since the gas streams converged immediately upon entering the mixer and reactor, the flow rates employed afforded an average retention time of reactant gases and products within the reactor of only .13 second. The resulting TiO$_2$ suspension issuing from the bottom of the reactor at a temperature of about 1000° C. was quenched in less than 2 seconds to 300° C. by commingling therewith sufficient cold chlorine gas. The TiO$_2$ product was then separated and recovered in a conventional type filter from the cooled reaction products. The recovered product consisted of a high-grade rutile pigment and substantially 100% conversion of the titanium tetrachloride was determined to have taken place in the process.

For comparative purposes, a similar experiment was made employing the same types of reactants, temperatures, amounts, ratios and flow rates mentioned above, but the mixing of the reactants was effected in a prior art concentric jet type of reactor of equivalent capacity. In this operation, reactant mixing was determined to be still incomplete at a point 12″ downstream from the point where the reactants were separately introduced into the mixing zone, the resulting TiO$_2$ product was anatase rather than rutile, and the TiCl$_4$ conversion was only 30%.

Alternatively, a mixing apparatus of the type shown in Fig. II, also constructed of a suitable corrosion-resistant or other type of metal or refractory material capable of rendering the apparatus resistant to the attack of corrosive fluids, especially chlorine, can be employed herein. In this modification there is shown a tubular conduit or like fluid-conveying means 13, made up of the segment or section portions 14 and 15, the terminal or open-end portions 16 and 17 of which, respectively, are arranged in cooperative relationship with each other so as to form in the space thus provided a transverse, peripheral opening or slotted inlet 18 which communicates with the interior of the conduit 13 and through which a fluid reactant can be separately introduced at a controlled rate of flow into said conduit for admixture and reaction with one or more other reactants concurrently fed into and through said conduit, as will presently appear. Disposed substantially co-extensively with an in concentric, spaced relationship from the internal walls of the section member 14 is a tubular element 19, adapted to form within said conduit fluid passages 20 and 21 having inlets 22 and 23, respectively, and through which suitable reactant fluids may be separately conveyed into the apparatus at independently-controlled rates of flow to a mixing and reaction zone 22 into which passages 20 and 21 as well as the slot inlet 18 discharge reactants fed therethrough. Fixedly or otherwise suitably secured to or associated about the conduit 13, and at the point in said conduit where the section members 14 and 15 are arranged so as to form the peripheral slot inlet 18 is a suitable manifold or other conventional type of fluid-conducting means 24 provided with an internal passage 25 and an inlet 26 therefor in communication with a source of reactant supply (not shown). The manifold element is so arranged with respect to the conduit 13 that its inlet 26 and passage 25 are maintained in free and open communication with the peripheral inlet 18 and the mixing and reaction zone 22.

In operating this Fig. II type of apparatus to obtain, for instance, a high-quality rutile $TiO_2$ pigment utilizing the process of the aforesaid H. H. Schaumann application, anhydrous titanium tetrachloride and an oxygen-containing gas such as air, suitably enriched with from, say, about .1% to 3% of water vapor, are mixed and reacted within the apparatus, the mixing and reaction zone 22 of which is maintained at a temperature ranging from 800–1350° C. throughout the reaction. Thus, the air and water vapor mixture, preheated to a temperature above 350° C., is separately and continuously charged from a source of supply and at a controlled, regulated rate of flow and pressure, into the apparatus through the inlets 22 and 26 of the passages 20 and 25 thereof to discharge from the passage 20 through its outlet 22′ and from the peripheral slot 18 (in the form of a sheeted stream) into the mixing and reaction zone 22. Simultaneously with the introduction of the humidified oxidizing agent, vaporized titanium tetrachloride, also at a temperature above 350° C., is charged at a regulated flow rate and pressure into the inlet 23 leading to the passage 21, to pass downwardly through the latter for ultimate discharge into said mixing and reaction zone. As a result, substantially instantaneous mixing of the titanium tetrachloride and oxidizing agent occurs within said zone, with complete mixing and reaction being effected after the reactants have passed but a relatively short distance downstream from the peripheral slot inlet 18. As in Fig. I, rapid and complete admixture of the fluid reactants is accomplished by reason of the radial flow of one reactant from the outer periphery of the mixing and reaction zone towards the center of said zone and at right angles to and across the axis of flow of the other reactant being separately introduced into that zone. As in the instance of Fig. I, retention times ranging from about .1 to 10 seconds are utilized and the gaseous reaction products containing the desired $TiO_2$ end product in suspension are quenched quickly on discharge from the oxidation zone to a temperature below 600° C. and recovered in accordance with the methods already referred to.

In the modification illustrated by Fig. III, a radial slot jet type of mixer and reactor is shown. This comprises an elongated, tubular element 27 suitably disposed within which is a downwardly-extending, annular tubular insert member 28 which ranges to a point substantially intermediate the length of said elongated tube 27. The insert 28 is concentric with said tube and is spacedly disposed from its internal walls to form, as shown, a separate fluid passage 29 having an inlet 30 in communication with a source of fluid supply (not shown). Concentrically positioned within and coinciding with the length of the tubular insert 28 in order to form a fluid passage 31 having an inlet 31′ is a depending plug element 32, the lower extremity or end portion of which terminates in a plane-surfaced element 33 which has substantially the same diameter as the tubular insert 28. The surface 33′ of the element 33 extends slightly beyond and in opposite, spaced relationship from the termini 34 of the insert 28 to thereby form a peripheral slot opening or inlet 35 which is in open communication with the fluid passages 29 and 31 and with the mixing and reaction zone 36 into which reactants separately charged through said passages discharge, to leave the apparatus after reaction through the outlet 37.

In operating this Fig. III type of apparatus to obtain, for example, pigmentary rutile, in accordance with the above-mentioned H. H. Schaumann application, the vaporized $TiCl_4$ is introduced therein via the inlet 31′ for conveyance through the passage 31, at a controlled rate of flow. Simultaneously therewith, a preheated, gaseous, oxidizing medium, such as humidified air, is separately introduced into the device via the inlet 30 for passage at a controlled velocity through the passage 29. Quick admixture of the reactants occurs at the point where the $TiCl_4$ discharges in the form of a thin sheet or stream from the peripheral slot 35 into the passage 29 and in a direction substantially at right angles to the flow of the oxidizing medium being fed through said passage. The mixing and reaction zone of the apparatus is maintained at a temperature ranging from 800–1350° C. and, as a result of the substantially instantaneous mixing effected between the $TiCl_4$ and oxidizing agent, a quick mixing and reaction takes place within the zone 36 and within a relatively short distance from the peripheral slot 35. The resulting reaction products are allowed to remain in the apparatus for but a short retention time, and, on their discharge through the outlet 27, are quickly quenched to a temperature below 600° C. and $TiO_2$ recovery therefrom effected in accordance with the methods already alluded to.

The following examples comprise additional specific illustrations of further particular adaptations of the invention and likewise are not to be construed as in limitation of its underlying principles and scope:

*Example II*

Employing the device shown in Fig. II, constructed of fused silica, and in which the tubular conduit 14 had an internal diameter of 2⅛″, the slotted inlet 18 was 1/32″ in width, while the fluid passages 20 and 21 had internal diameters of 3/32″ and 1¾″, respectively, pigment titanium dioxide was produced by the vapor phase oxidation of $TiCl_4$. The slotted inlet and the mixing and reaction zone 22 of said device were enclosed in a furnace and were maintained throughout the run at a temperature of 1000° C. Prior to introduction into the apparatus, all reactants were preheated to a temperature of approximately 950° C.

The preheated air containing 0.07% $H_2O$ vapor by volume was continuously introduced through the passage 20 to flow through the apparatus at a rate of 24.1 l./m. (measured at 0° C. and atmospheric pressure). Simultaneously, 42 l./m. of preheated air containing 0.56% $H_2O$ by volume were continuously introduced through the slotted inlet 16 in the form of a thin sheet or stream to continuously flow in a radial direction from the outer periphery of the conduit 13 toward its substantial center comprising mixing zone 22. Simultaneously, vaporized $TiCl_4$ was continuously fed at a flow rate of 107 g./m. into the apparatus via inlet 23 to flow downwardly therethrough via passage 21. Continuous, instantaneous mixing and reaction of the $TiCl_4$ and oxidizing gas took place upon their coming together within zone 22 of section 15 which was heated for 9½″ of its length. The gas streams converged immediately upon their entering the mixing and reaction zone, the flow rates utilized provided an average retention time of reactant gases and products within the reactor of about .15 second. The resulting $TiO_2$ suspension issuing from the bottom of the reactor at a temperature of about 1000° C. was quenched in less than 5 seconds' time to 300° C. by commingling sufficient cold chlorine gas therewith. The $TiO_2$ product was then separated and recovered in a conventional filter from the cooled reaction products and the final $TiO_2$ product was found to consist of high-quality pigmentary rutile with substantially 100% conversion of the TiCl₄ being determined to have taken place in the operation. The excellent quality of the rutile TiO₂ pigment recovered is evident from the fact that it had a tinting strength value of 185, a color value of 18.2Y and hiding power, texture, and particle size uniformity equal to the highest-quality commercially-obtainable TiO₂ pigments.

(The values given herein in respect to color, tinting strength, hiding power and texture were determined in accordance with the methods described or referred to in U. S. Patents 2,253,551 and 2,046,054.)

*Example III*

Zirconium tetrachloride was mixed and reacted in the vapor phase with air under substantially the same conditions and in the same type of mixing and reactor device described in Example II. ZrCl₄ vapor, preheated to about 900° C., was continuously introduced through the slotted inlet at a rate of 1000 g./hr. Simultaneously, dried air, similarly preheated, was continuously admitted through passage 21 at a rate of 255 L./hr., while a like amount of air, containing 2% by volume of water vapor, was continuously and simultaneously admitted through the annular passage 20. Substantially complete oxidation of the ZrCl₄ was effected and the resulting ZrO₂ material recovered from the reaction products was high in brightness and small and uniform in respect to particle size to comprise an excellent opacifier for vitreous enamels.

*Example IV*

Aluminum chloride was mixed and reacted in the vapor phase with oxygen under the same conditions and in the same type of apparatus as employed in Examples II and III. The preheated AlCl₃ vapor was continuously introduced through the slotted inlet at a rate of 600 g./hr. while the preheated oxygen was simultaneously introduced at a rate of 160 g./hr. through the passages 20 and 21. As in the instance of Examples II and III, complete oxidation of the metal chloride vapor resulted, the Al₂O₃ product recovered comprising a very finely-divided, highly-useful material.

*Example V*

Employing a slot jet device of the type shown in Fig. II, pigment titanium oxide was obtained through the vapor phase oxidation of TiCl₄. The apparatus was constructed of silica, its main tube 13 having a 2" internal diameter and the central, concentric tube 19 being 1" in diameter. The slot inlet 18 was 1/32" in width, and the mixing and reaction chamber 22 into which the reactants discharged was 20" in length and was maintained at a temperature of 1000° C. Vaporized TiCl₄, at a temperature of 825° C., was continuously passed through the slot inlet from the passage 25 at a rate of 34 gram mols per hour. Simultaneously, dry air, preheated to a temperature of 800° C. and in amount sufficient to provide 10% O₂ in excess of the stoichiometric requirement for reaction with the TiCl₄ to form TiO₂, was divided into two portions and separately introduced into the apparatus via the passages 20 and 21, in amount sufficient to afford equal velocities of about 7 ft./sec. Prior to such introduction, that portion of the air fed through passage 21 was enriched by adding ½ cc. per minute of water vapor thereto to promote the oxidation reaction and control the uniformity of particle size and other pigment characteristics of the ultimate TiO₂ product. The TiCl₄ was thus continuously injected into the air stream through the peripheral slot in the form of a thin, sheeted stream flowing from the outer circumference of the conduit 13 toward its center in a direction at right angles to the flow of the air. As a result, substantially instantaneous mixing of the reactants took place on their coming together, with mixing having been determined to be essentially complete at a point 2" downstream from the slot. A TiO₂ pigment consisting of 95% rutile was recovered and a complete reaction was obtained. The TiO₂ particles had an average radius of 0.14 micron and a uniformity equal to the best quality of TiO₂ pigments. The tinting strength value of the product was 189, its color rating was 17:2Y, and its excellent texture and hiding power, equal to the highest quality of commercially obtainable TiO₂ pigments, rendered it useful in all types of pigment application. (These values were determined in accordance with the methods referred to in Example II.)

In a comparable operation, utilizing equivalent reactants, temperatures and rates of flow, but effecting reactant admixture in a concentric type of jet mixing device of the prior art, the yield of TiO₂ was only 30%, to clearly evidence the existence of incomplete mixing and reaction.

*Example VI*

Employing an apparatus of the type shown in Fig. I, constructed of silica, the tubular element 1 of which was 15 inches in length, had an internal diameter of 1¾ inches, and was provided with a transverse, peripheral slot inlet 9, 1/32 of an inch in width, a 50–50 mixture of oxygen and air, preheated to a temperature of 1000° C., was continuously charged at a rate equivalent to 20 parts by weight of O₂ per hour through the passage 4. Simultaneously, vaporized TiCl₄, preheated to a temperature of 865° C., was continuously fed at a constant flow rate of 100 parts by weight per hour through the passage 11 of the manifold 10 to issue in the form of a film-like stream through the peripheral slot inlet 9 into the passage 4 and across the stream of oxidizing gas being simultaneously conveyed through such passage. Substantially instantaneous and complete mixing of the reactants took place upon convergence of the gas streams within the mixing and reaction zone and under a prevailing reaction temperature of 1200° C. The flow rates utilized provided an average retention time of reactants and reaction products within the mixing and oxidation zone of only .15 second and the resulting hot TiO₂ suspension upon issuance from the oxidation zone was quenched in less than 2 seconds to below 600° C. by commingling sufficient cold chlorine gas therewith. A total time period of about 2 seconds was employed in the reactant mixing, reaction, reaction product withdrawal, and quenching operations. The TiO₂ pigment product was then separated and recovered from the cooled suspension in a conventional type filter and was found to consist of a high-grade rutile pigment. A substantially 100% conversion of the TiCl₄ was determined to have taken place in the operation.

Although described as applied to certain specific embodiments which utilize particular reactants, ratios, temperatures, fluid velocities, apparatus and dimensions, the invention is not limited thereto. Hence, due variance therefrom can be had without departing from its principles and scope. Generally, the invention is usefully adaptable for effecting the speedy and efficient mixing and/or reaction of all types of gaseous reactants. It is particularly useful in the oxidation of metal halides, such as the chloride, bromide, or iodide of such metals as titanium, zirconium, aluminum, silicon, antimony, zinc, tin, etc., which will react in the vapor phase with an oxygen-containing gas, such as air, oxygen, or moisture-enriched air or oxygen, mixtures of oxygen with air or various inert gases, etc. to produce a solid metal oxide. Examples of such metal oxides include those of titanium, aluminum, zinc, antimony, zirconium, columbium, silicon, iron, chromium, vanadium, tin, etc. It is outstandingly useful in and hence preferably employed in the production of pigmentary rutile by intimately mixing and reacting in the vapor phase and at temperatures ranging from about 800–1350° C. (preferably from 900–1200° C.) volatilized titanium tetrachloride with an oxidizing gas in the presence of from .05% to 5% and not to exceed 10% (based on the total volume of gaseous reactants fed to the reaction zone) of water vapor, as contemplated by the disclosure of the aforesaid H. H. Schaumann application Ser. No. 653,428, filed March 9, 1946, now U. S. Patent 2,488,439, issued November 15, 1949.

While the invention has been illustratively described as applied to embodiments in which a single peripheral slot inlet has been employed, it will be obvious that a plurality thereof can be used, if desired.

Due to the excellent mixing efficiency and complete reaction which can be attained in the invention, an accurate control can be exercised over the particle size and uniformity characteristics of the metal oxide reaction product being produced. This is very advantageous in preparing pigment-useful titanium oxide compounds which not only must exhibit uniform particle size values, but also must possess high values in respect to other essential properties, such as tinting strength, color, opacity, hiding power, etc.

As already indicated, in effecting a continuous type of mixing operation under the invention there preferably exists a differential in fluid flow rates or mass velocities between the two streams being commingled. Mass velocity is an expression used in engineering to define the rate of flow of a fluid in terms of its weight: that is, it is a measure of its weight per unit area per unit time. Similar relative values are also obtained by multiplying linear velocity by the molecular weight of the particular fluid. The relative mass velocities of two or more fluids being mixed is an important factor in determining the optimum conditions for their admixture. In the present invention, such mass velocity ratios are resorted to as will induce a quick or substantially instantaneous and thorough mixing of the reactants upon their coming together in the mixing zone through which one or more of the fluids is being conveyed. Under practical conditions, as the ratio of mass velocity of the fluid conveyed through the peripheral slot inlet to the fluid passing through the main conduit increases, mixing efficiency will also increase. The flow ratios used in any given instance will obviously depend upon the fluids to be mixed and reacted, as well as the end product or products desired. Where, for instance, the fluids comprise an oxidizing gas such as air and vaporized titanium tetrachloride, flow rates and ratios sufficient to provide a mass velocity of the fluid flowing through the peripheral inlet of from 15 to 40 times that of the fluid passing through the main conduit are best employed. These ratios can be varied, if desired, and to an extent such that the mass velocity of the stream through the peripheral inlet will range from 2 to 100 times that of the stream through the main conduit. Similar mass velocity ratios also can be utilized, when other types of fluids, such as herein contemplated for use, are being mixed for reaction.

As has been indicated, the width of the peripheral or circumferential slot inlet is subject to variance, but generally its aperture width should conform to the following formula:

$$\text{Thickness of slot} = \frac{\text{Density of slot fluid}}{\text{Density of tube fluid}} \times \frac{\text{Volume flow rate of slot fluid}}{\text{Volume flow rate of tube fluid}} \times \frac{\text{radius of tube}}{2} \times \frac{1}{\text{mass velocity ratio of slot fluid to tube fluid}}$$

The type of peripheral, slotted inlet used herein and the manner of introducing one fluid reactant into another will bear considerably upon the quickness and completeness of reactant commingling, the reaction itself, and the type and uniformity of the ultimate solid final product. In the vapor phase production of pigmentary $TiO_2$, these factors are of even more important significance since they have a direct effect upon the successful minimization or complete avoidance of apparatus plugging due to undesired reaction product build-up on the internal walls of the reaction vessel. When the slotted inlet, restricted in cross-section and extending about substantially the entire periphery or perimeter of the conduit or zone wherein the mixing operation is to be effected, is resorted to, these difficulties are effectively overcome. Preferably, the circumferential slot inlet should be so arranged and disposed in respect to the passage or zone in and through which the mixing is to be effected that the reactant being constantly introduced through the slot and into said passage or zone will necessarily flow in the form of a thin sheet or stream and in a direction substantially at right angles (approximately 90°) to the direction of flow of the reactant axially passing in unmixed state through such passage or zone. Arranging the inlet in this fashion insures introduction into and dispersion throughout said latter reactant of a continuous stream of the mixing reactant or reactants being sheeted or jetted in a relatively thin stream from the outer circumference of the conveying or mixing conduit towards its center. While a 90° angle of injection or feeding of one reactant into another is preferred for use, greater or lesser degree angles can be used, since the beneficial results of the invention are also obtained from any appreciable angle which affords a transverse or cutting-across introduction of the mixing reactant into the other reactant axially flowing through the mixing conduit. For most practical purposes, impinging angles from about 20° and to from, say, 45° to 135°, will prove satisfactorily useful.

The dimension or cross-sectional area of the aperture or slot inlet means employed herein are also variable, the extent or scope thereof in any given instance being dependent upon the needs of the particular mixing operation being undertaken. As already noted, the peripheral slot inlet of this invention permits the mixing reactant to enter the mixing zone from all points about the circumference or periphery of that zone towards its center and provides a relatively large area of fluid entry in proportion of a relatively small or narrow mixing zone conduit diameter. Hence, one reactant enters the flowing stream of a second reactant in substantial quantity but in a relatively thin film or sheet to become quickly penetrated by and dispersed in the said second reactant already flowing through the mixing zone, thereby effecting substantially instantaneous and complete reactant mixing. This is evident when one considers that when the internal diameter of a conduit in which the mixing operation is to take place is 2" and the continuous, peripheral slot inlet is $\frac{1}{32}$ of an inch wide, the reactant inlet area of said slot is $\frac{3}{16}$ of a square inch. In a prior art mixer, an equivalent reactant inlet area would require a tributary conduit $\frac{1}{2}"$ in diameter and would result in a reactant stream therethrough sixteen times as great in thickness. Obviously, the extent and width of the inlet slot will be dependent upon the size of the mixing conduit or zone and the type, nature and amount of reactant or reactants to be fed therethrough for admixture in said conduit or zone. Similarly, the slot inlet, though preferably continuous, may be discontinuous or interrupted, if desired, by suitable supporting elements but in no case should these supporting members be in such extent or proportion as to prevent the desired sheeting-out from the inlet of the reactant stream being passed therethrough.

It is frequently desirable to impart a swirling motion to the stream issuing from the peripheral slot, and such motion may be supplied by admitting the fluid to the manifold surrounding the peripheral opening through one or more tangential inlets. In such event, the fluid will proceed through the opening in the form of a thin sheeted stream toward the center of the conduit in such a manner as to have both radial and tangential components. The fluid passing through the main conduit will flow in an axial direction until the point of entry of the said thin sheeted stream. The swirling motion of the latter will add to the turbulence at the confluence of the two streams, and even greater mixing efficiency will result.

As will be evident, the mixing device of this invention is adaptable to a wide variety of uses for effecting the speedy and efficient mixing of any desired number or type of reactants, especially vaporized metal halides, to promote and induce their rapid reaction with another gaseous reactant. Because of its relative simplicity and ease of construction, it affords optimum conditions for effecting the desired mixing; and because of its high efficiency, less velocity need be imparted to the reactants for a given mixing rate, with consequent less initial energy input being necessitated. Mixing efficiency being always at a desired maximum, undesirable recirculation of the mixed fluids is avoided or minimized, and undesired countercurrents or eddies are prevented, with their accompanying "dead spots" in which no relative movement of the reactants under treatment would occur.

The extent and completeness of fluid reactant mixing in the invention can be readily demonstrated by continuously feeding air, containing about 1.0% by volume of dry $NH_3$ gas, through the passage 4, for example, of Fig. I, at a rate of, say, 13.7 C. F. M. Simultaneously, sufficient dry hydrogen chloride gas to form a visible $NH_4Cl$ smoke upon reaction with the ammonia may be fed at a constant rate of about 10.9 C. F. M. through the slot inlet 9 for discharge into the air-$NH_3$ gas stream flowing through passage 4. The rate of mixing is readily determined by observing the formation of $NH_4Cl$ smoke. Essentially complete mixing will be observed to result by the time the reactants have passed a point about 2″ downstream from the slot 9. In a comparable experiment, utilizing the same concentrations and rates of gas flow, but employing a prior art concentric jet type of mixer, results in incomplete reactant mixing even after the mixed reactants have passed more than 12″ downstream from their points of original introduction into the mixing zone.

I claim as my invention:

1. A process for the direct production of a solid anhydrous pigmentary metal oxide by the rapid mixing and reaction of a vaporized anhydrous metal halide and an oxidizing gas, comprising separately and continuously introducing said vaporous halide and oxidizing gas reactants at independently controlled rates of flow into a closed reactor, rapidly commingling said reactants therein and reacting them in a reaction zone thereof at temperatures ranging from about 800–1400° C. by charging one reactant through a restricted, peripheral slotted inlet into said zone in the form of a thin, sheeted stream directly into the other reactant and in a direction angular to the direction of flow of said other reactant being separately and simultaneously charged into said zone, withdrawing the resulting products of reaction from said zone and cooling them to below 600° C. within from .05 to 5 seconds from the time of introduction of said metal halide and oxidizing gas reactants into said zone, and recovering the metal oxide reaction product from the cooled products of reaction.

2. A process for the direct production of anhydrous pigmentary titanium oxide through the rapid mixing and reaction of vaporized titanium tetrachloride and an oxidizing gas, comprising separately and continuously introducing said tetrachloride and oxidizing gas reactants, at independently controlled flow rates, into a closed reactor, rapidly commingling them in a relatively restricted mixing and reaction zone thereof in said reactor and subjecting them to reaction therein at temperatures ranging from about 800–1350° C., effecting said commingling by charging one reactant through a restricted, peripheral slotted inlet into said zone for flow in the form of a thin, sheeted stream directly into and in a direction angular to the direction of flow of the other reactant being simultaneously fed into said zone from a separate inlet, withdrawing the resulting titanium oxide reaction product from said zone and preventing particle size growth thereof by quickly quenching said product to below 600° C. within from .05 to 5 seconds from the time of introduction of said reactants into the reaction zone, and recovering the titanium oxide reaction product from the cooled products of reaction.

3. A process for the direct production of anhydrous pigmentary titanium oxide through the rapid mixing and reaction of vaporized titanium tetrachloride and an oxygen-containing gas, comprising separately introducing said tetrachloride and oxidizing gas reactants continuously and at independently controlled rates of flow into a closed reactor, rapidly commingling them in a relatively restricted, elongated mixing and reaction zone in said reactor and subjecting them to reaction in said zone at temperatures ranging from about 1000–1350° C., effecting said commingling by charging one reactant from a peripheral, restricted, slotted inlet into said zone in the form of a thin, film-like stream directly into the other reactant and in a direction angular to the direction of flow of said other reactant being simultaneously and separately charged into said zone from another inlet, withdrawing the resulting products of reaction from said zone and quenching them to below 600° C. within a time period of from .05–5 seconds from the time of introduction of said reactants into said zone, and recovering the pigmentary titanium oxide reaction product from the cooled products of reaction.

4. A method for the direct production of anhydrous pigmentary titanium oxide by rapidly mixing and reacting vaporized titanium tetrachloride and an oxygen-containing gas which comprises separately and continuously introducing said tetrachloride and oxidizing gas reactants, at independently controlled rates of flow into a closed reactor, rapidly commingling them therein in a relatively restricted, elongated mixing and reaction zone and subjecting them to reaction in said zone at temperatures ranging from about 1000–1350° C., effecting said commingling by charging one reactant as a film-like stream from a restricted peripheral slotted inlet into said zone directly into the other reactant and in a direction angular to the direction of flow of said other reactant which is being simultaneously and separately charged into said zone, withdrawing the resulting products of reaction from said zone and quickly quenching them to below 600° C., effecting said commingling, reaction, withdrawal and quenching operations within a total time period of about 2 seconds from the time of introduction of the reactants into said zone, and recovering the titanium oxide reaction product from the cooled products of reaction.

5. A method for producing pigmentary anhydrous titanium oxide by reacting vaporized titanium tetrachloride with an oxidizing gas containing from .05% to 10% by volume of $H_2O$, based on the total volume of gases being reacted, which comprises separately and continuously conveying said vaporized tetrachloride and oxidizing gas reactants at independently controlled rates of flow into an enclosed, elongated, restricted reaction zone while maintaining a mass velocity on said tetrachloride reactant of from 2–100 times that maintained on said oxidizing gas, rapidly commingling them in a mixing and reaction zone in said reactor and reacting the resulting mixture at temperatures ranging from about 1000–1350° C. by charging said tetrachloride reactant into said zone from a slotted, peripheral inlet thereto in the form of a thin, sheeted stream, directly into and at an angle to the direction of flow of said oxidizing gas reactant being simultaneously charged into said zone from a separate inlet, withdrawing the resulting reaction products from said zone and quickly quenching them to below 600° C., within about .05–5 seconds from the time of introduction of said reactants into said zone, and recovering the titanium oxide pigment from the cooled products of reaction.

6. A method for producing pigmentary anhydrous titanium oxide by reacting titanium tetrachloride in the vapor phase with an oxidizing gas containing from .05% to 10% by volume of $H_2O$, based on the total volume of gases being reacted, which comprises separately and continuously conveying said chloride and oxidizing gas reactants, preheated to temperatures above 800° C., into a relatively restricted, elongated mixing and reaction zone of a closed reactor, maintaining a mass velocity flow rate on said titanium tetrachloride reactant ranging from 15–40 times that maintained on said oxidizing gas, rapidly commingling said reactants in said zone and reacting the resulting mixture therein at temperatures ranging from 1000–1350° C. by charging the tetrachloride reactant as a thin, sheeted stream from a peripheral, slotted inlet to said zone directly into and at a 45–135° angle to the direction of flow of the oxidizing gas being separately charged into said zone from a separate inlet thereto, withdrawing the resulting $TiO_2$ reaction product from said zone and quickly quenching it to below 600° C. within a period of from .05 to 5 seconds from the time said reactants are introduced into said zone, and recovering the cooled titanium oxide pigment from the products of reaction.

7. A method for producing pigmentary anhydrous titanium dioxide by reacting titanium tetrachloride in the vapor phase with preheated air containing from .05–5% by volume of water vapor, based on the total volume of gases being reacted, comprising separately and continuously conveying said vaporized chloride and air reactants at independently controlled rates of flow into a closed, elongated, restricted reactor, rapidly commingling and imparting a swirling action to said reactants within a mixing and reaction zone of said reactor and subjecting them to reaction at temperatures ranging from about 900–1350° C. by jetting said chloride reactant in the form of a thin, sheeted stream from a restricted, peripheral slotted inlet arranged about said zone directly into and at a 45–135° angle to the direction of flow into said zone of said air reactant being separately and simultaneously charged thereto, withdrawing the resulting $TiO_2$-containing reaction products from said zone, quickly quenching them to below 600° C. within a time period of from .05 to 5 seconds from the time the tetrachloride and air reactants are introduced into the reaction zone, and recovering the cooled $TiO_2$ pigment from the quenched products of reaction.

References Cited in the file of this patent

UNITED STATES PATENTS

| Number | Name | Date |
|---|---|---|
| 885,766 | De Laval | Aug. 28, 1908 |
| 1,118,865 | Johnston et al. | Nov. 24, 1914 |
| 1,148,194 | Seifert et al. | July 27, 1915 |
| 1,184,611 | Boucher | May 23, 1916 |
| 1,213,887 | Krause | Jan. 30, 1917 |
| 1,967,235 | Ferkel | July 24, 1934 |
| 2,340,610 | Muskat et al. | Feb. 1, 1944 |
| 2,361,150 | Petroe | Oct. 24, 1944 |
| 2,394,633 | Pechukas | Feb. 12, 1946 |
| 2,405,580 | Jackson | Aug. 13, 1946 |